(12) United States Patent
Sung et al.

(10) Patent No.: US 8,525,437 B2
(45) Date of Patent: Sep. 3, 2013

(54) DEVICE FOR CONTROLLING CURRENT OF LED

(75) Inventors: Joon Youp Sung, Gyeonggi-do (KR);
Jae Shin Lee, Gyeonggi-do (KR); Seung Kon Kong, Gyeonggi-do (KR); Jung Sun Kwon, Gyeonggi-do (KR); Jung Hyun Kim, Gyeonggi-do (KR); Bo Hyun Hwang, Gyeonggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 240 days.

(21) Appl. No.: 13/028,618

(22) Filed: Feb. 16, 2011

(65) Prior Publication Data

US 2012/0068619 A1    Mar. 22, 2012

(30) Foreign Application Priority Data

Sep. 16, 2010    (KR) .................. 10-2010-0090997

(51) Int. Cl.
*H05B 37/02*    (2006.01)
(52) U.S. Cl.
USPC ........................ 315/291; 315/307; 315/308
(58) Field of Classification Search
USPC .............. 315/185 R, 200 R, 209 R, 224–226, 315/291, 307, 308, 312
See application file for complete search history.

(56) References Cited

U.S. PATENT DOCUMENTS

| 7,286,123 | B2 * | 10/2007 | Yang ............................. 345/204 |
| 7,839,097 | B2 * | 11/2010 | Chen et al. .................... 315/291 |
| 8,198,830 | B2 * | 6/2012 | Lin et al. ...................... 315/307 |
| 2009/0021182 | A1 | 1/2009 | Sauerlaender |

FOREIGN PATENT DOCUMENTS

| KR | 1020080048592 | | 6/2008 |
| KR | 1020080112503 | A | 12/2008 |
| KR | 1020090065848 | A | 6/2009 |
| KR | 1020090086030 | | 8/2009 |

OTHER PUBLICATIONS

Office Action corresponding to KR 10-2011-049128, dated Aug. 23, 2012.
Notice of Allowance issued in Korean Application No. 10-2011-049128 dated May 16, 2013.

* cited by examiner

*Primary Examiner* — Jimmy Vu
(74) *Attorney, Agent, or Firm* — Lowe, Hauptman & Ham

(57) ABSTRACT

Disclosed herein is a device for controlling current of an LED including a constant current generator, a current mirror, and a current amplifier, the device controlling current of an LED, comprising: a selector outputting an L signal or an H signal according to an input control signal; and a current changing unit formed by connecting at least one switching unit in parallel, the switching unit including a transistor and a switch connected to the transistor in series. The device for controlling current of an LED adjusts current supplied to the current amplifier using a SEL input without an effect of a noise, thereby making it possible to change the current of the LED without separately changing a resistor.

4 Claims, 3 Drawing Sheets

DEVICE FOR CONTROLLING CURRENT OF LED

CROSS REFERENCE(S) TO RELATED APPLICATIONS

This application claims the benefit under 35 U.S.C. Section [120, 119, 119(e)] of Korean Patent Application Serial No. 10-2010-0090997, entitled "Device for Controlling Current of LED" filed on Sep. 16, 2010, which is hereby incorporated by reference in its entirety into this application.

BACKGROUND OF THE INVENTION

1. Technical Field

The present invention relates to a device for controlling current of a light emitting diode (LED), and more particularly, to a device for changing current of an LED capable of changing current determining brightness of the LED without separately changing an external power supply or a resistor.

2. Description of the Related Art

An organic light emitting diode (LED) has been widely used in various fields such as illumination, a backlight unit (BLU), or the like. Recently, as a market for the LED has rapidly expanded, the related technologies have rapidly advanced correspondingly.

Meanwhile, the current of the LED are mainly set and controlled by a conversion dimming signal (ADIM) and a resistor (RLED) parameter. When voltage is applied from the outside, a noise included in the voltage appears in output current as it is. Therefore, a scheme of changing an external resistor has been mainly used.

However, even in the case of using the scheme of changing the external resistor as described above, since a resistor of each of the LED modules should be changed, it is difficult to standardize the LED modules.

FIG. 1 shows an LED driving circuit most widely used in the related art.

As shown in FIG. 1, a constant current generator 110 generates reference current (Iref) to LED current (ILED) using ADIM voltage and an RLED and transfers the reference current to an input end 131 of a current amplifier 130 using a current mirror 120, and the current amplifier 130 may obtain the LED current (ILED) corresponding to N times of the reference current using the ratio (N:1) of a resistor A to a resistor B.

Herein, in order to change the LED current (ILED), the ADIM voltage or the RLED should be changed. However, as described above, when the ADIM voltage is input from the outside, an input noise may be reflected on an output as it is, and when the RLED is changed, it is difficult to standardize the LED module.

In addition, in order to change the LED current, a single wire control scheme, a single wire clock counting scheme, and the like, in which a separate digital block is added may also be used. However, in the case of using the digital block, a separate digital source for generating a complicated digital clock signal is required.

SUMMARY OF THE INVENTION

An object of the present invention is to provide a device for changing current of an LED without separately adding a digital block or separately changing a resistor by adjusting current supplied to a current amplifier using a SEL input without an effect of a noise.

According to an exemplary embodiment of the present invention, there is provided a device for controlling current of an LED including a constant current generator, a current mirror, and a current amplifier, the device controlling current of an LED, including: a selector outputting an L signal or an H signal according to an input control signal; and a current changing unit including at least one switching unit connected in parallel, the switching unit including a transistor and a switch connected to the transistor in series, wherein the switch of the current changing unit is controlled by the signal output from the selector.

The selector may include at least one comparator and at least one resistor.

The selector may have non-inverting terminals receiving the control signal, inverting terminals receiving voltage divided by the resistor, and at least one amplifier comparing voltage of the inverting terminal with that of the non-inverting terminal to output the L signal or the H signal to an output terminal.

The selector may have inverting terminals receiving the control signal, non-inverting terminals receiving voltage divided by the resistor, and at least one amplifier comparing voltage of the inverting terminal with that of the non-inverting terminal to output the L signal or the H signal to an output terminal.

According to an exemplary embodiment of the present invention, there is provided a device for controlling current of an LED, including: a constant current generator; a current mirror including a first MOS transistor and a second MOS transistor; a selector outputting an L signal or an H signal according to an input signal; a MOS transistor having a source receiving driving power and a gate connected to a gate of the first MOS transistor; a current changing unit including a switch of which one end is connected to a drain of the MOS transistor; and a current amplifier having an input end connected to the other end of the switch of the current changing unit, wherein the switch is controlled by the signal output from the selector.

The current changing unit may include a plurality of switching units in which a switch is connected to the MOS transistor, the plurality of switching units being connected in parallel.

DESCRIPTION OF THE PREFERRED EMBODIMENTS

Hereinafter, configuration and operation of the present invention will be described in more detail with reference to the accompanying drawings.

Figure 2:
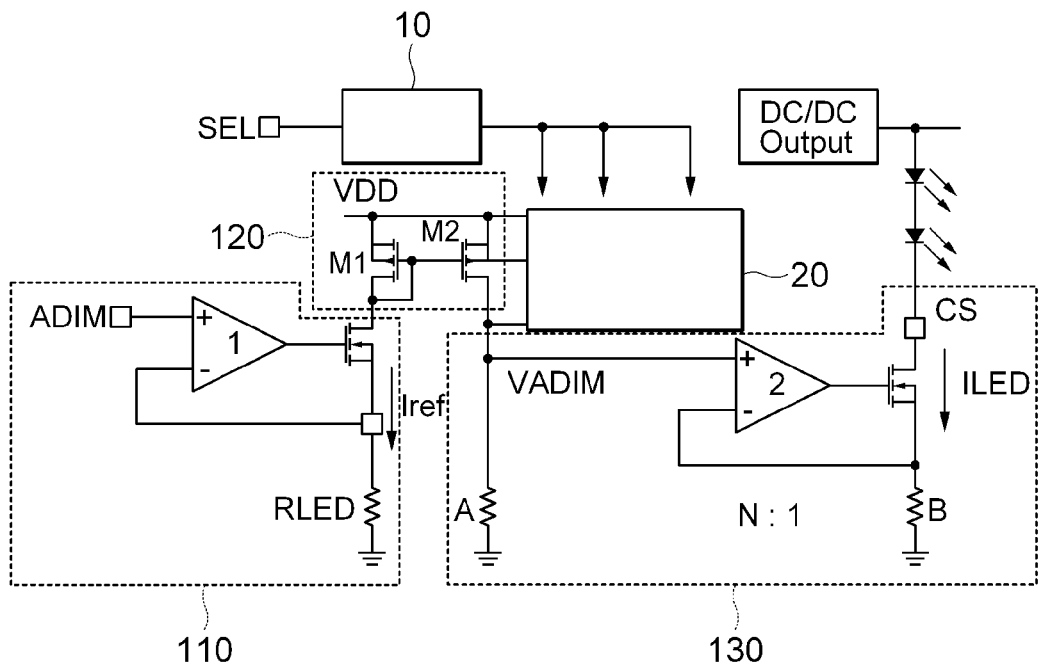
FIG. 2 is a circuit diagram showing a configuration according to an exemplary embodiment of the present invention.

FIG. 2 is a circuit diagram showing a configuration according to an exemplary embodiment of the present invention. A configuration in which a selector 10 and a current changing unit 20 are further included in the LED driving circuit according to the related art including the constant current generator 110, the current mirror 120 and the current amplifier 130 is shown in FIG. 2.

At this time, the specific configuration of the constant current generator 110, the current mirror 120 and the current amplifier 130 is similar to that widely used in the related art. Therefore, the detailed description thereof will be omitted.

Meanwhile, the selector 10 generates an output signal according to a signal (SEL signal) input to a control signal input terminal 13 to control the current changing unit 20. The current changing unit 20 changes current supplied to an input end (VADIM node) 131 of a current amplifier 130 according to an output signal from the selector 10.

Figure 3:
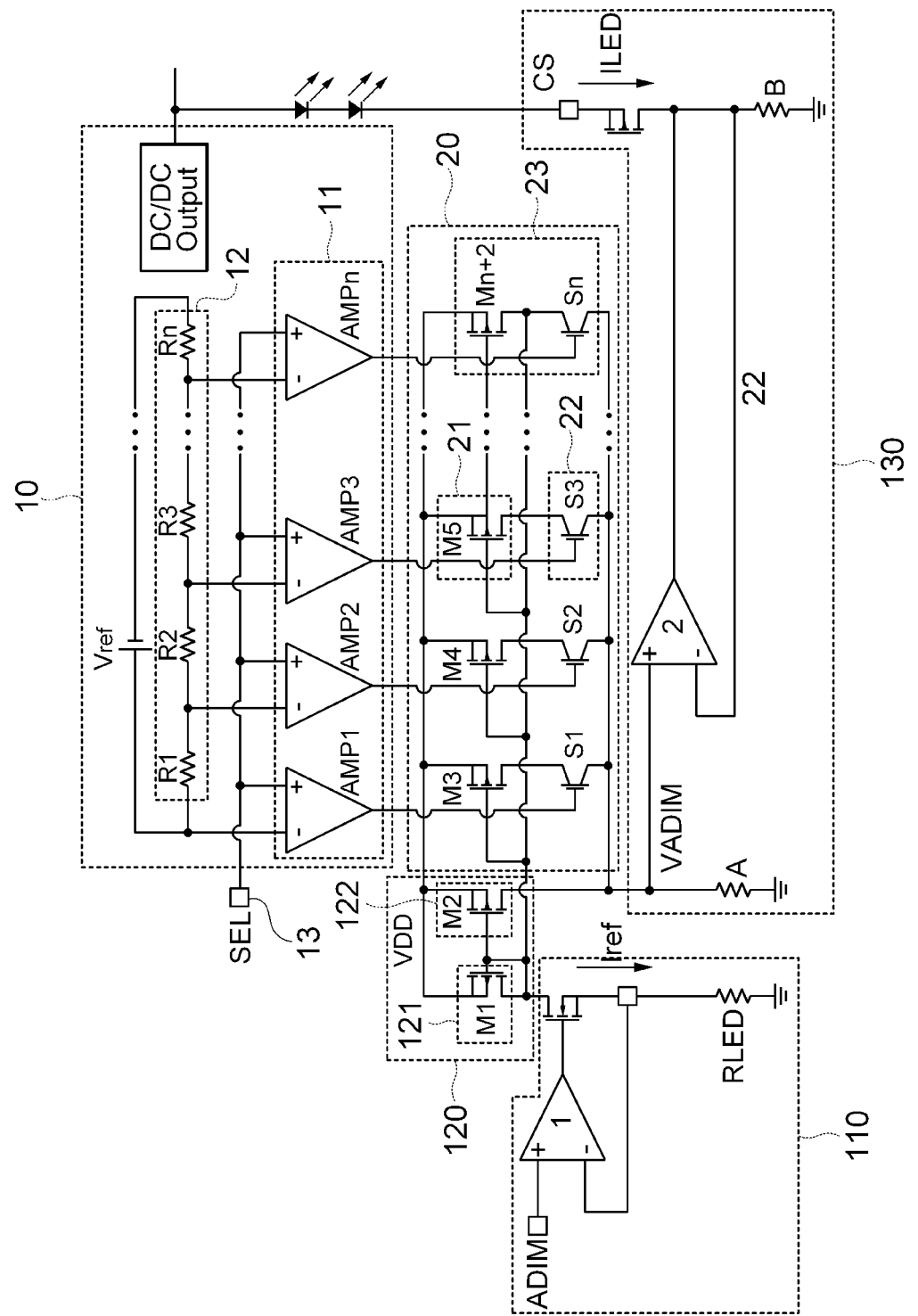
FIG. 3 is a circuit diagram showing a configuration according to another exemplary embodiment of the present invention.

FIG. 3 is a circuit diagram showing a configuration according to another exemplary embodiment of the present invention. The configurations of the selector 10 and the current changing unit 20 as described above are shown in detail in FIG. 3.

The selector 10 generates an output signal of L or H according to an input signal. As shown in FIG. 3, the selector 10 can include at least one comparator 11 whose non-inverting terminals receive the control signal, inverting terminals receive voltage divided by the resistor 12, and compare voltage of the inverting terminal with that of the non-inverting terminal.

According to the configuration as described above, reference voltage (Vref) is divided by resistors (R1 to Rn) to be applied to the inverting terminals of the amplifiers (Amp1 to Ampn), SEL voltage is applied to the non-inverting terminals, and the amplifiers compare the voltage of the inverting terminal with the voltage of the non-inverting terminal to output an L signal or an H signal. Therefore, the SEL voltage is adjusted, thereby making it possible to adjust the number of the L signal or the H signal output from the selector 10.

Meanwhile, the current changing unit 20 includes a plurality of switching units 23 connected in parallel, wherein a switch 22 is connected to a transistor in series in the switching unit.

At this time, although the transistor is shown as being a MOS transistor 21 and the switch 22 is shown as being a junction transistor in FIG. 3, it is obvious that other kinds of transistors than the configuration shown in FIG. 3 may be used and a scope of the present invention is not limited by the accompanying drawings.

In addition, the kinds of voltages input to the inverting terminal and the non-inverting terminal of the amplifier may be different according to the kinds of switches 22.

In addition, an output end of the selector 10 is connected to the switches 22 to transfer the L signal or the H signal to each of the switches 22.

According to another exemplary embodiment of the present invention, the transistor configuring the current changing unit 20 is the MOS transistor 21. The MOS transistor 21 has a source receiving a driving power and a drain connected to one end of the switch 22 to configure the switching unit 23. At this time, a gate of the MOS transistor 21 is connected to a gate of a first MOS transistor 121 (M1) configuring the current mirror 120.

The plurality of switching units 23 as described above are connected in parallel and the other end of the switch 22 is connected to an input end (VADIM node) (131) of the current amplifier 130 to configure the current changing unit 20.

Hereinafter, an operation principle according to an exemplary embodiment of the present invention will be described with reference to FIGS. 1 and 3.

Figure 1:
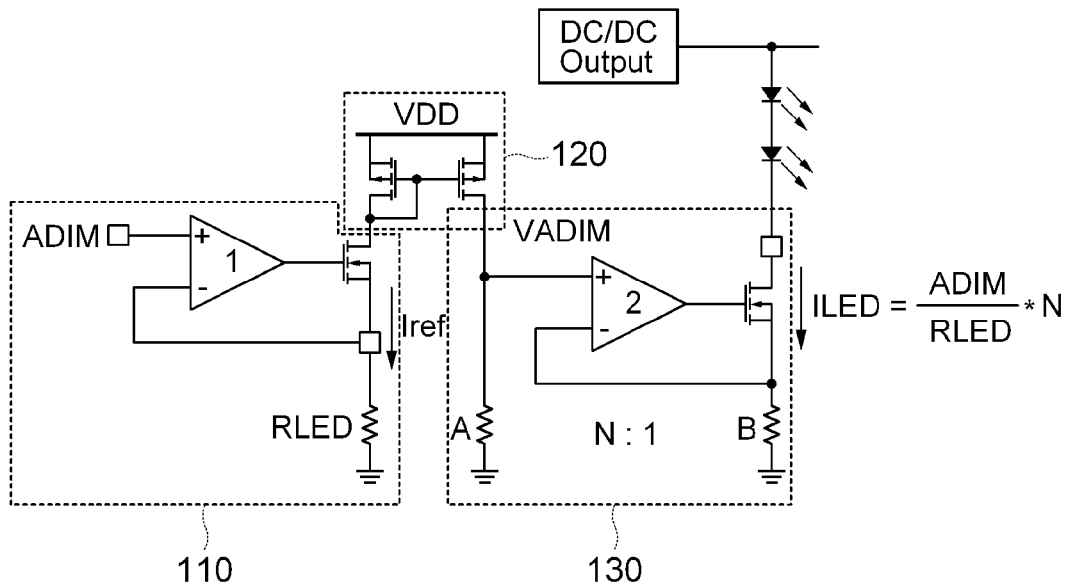
FIG. 1 is a circuit diagram showing a configuration of a device for controlling current of an LED according to the related art.

In the device for controlling current of an LED according to the related art in FIG. 1, the reference current (Iref) is generated by the ADIM voltage and the RLED in the constant current generator 110 and is applied to the VDAIM node by the current mirror 120 circuit.

A device according to an exemplary embodiment of the present invention shown in FIG. 3 is basically operated in the same scheme as that of the device for controlling current of an LED described above.

However, when a portion of the switches 22 of the current changing units 20 are turned-on by the output signal generated in the selector 10, each of the MOS transistors 21 connected to one end of the turned-on switch 22 forms the current mirror 120 together with the first MOS transistor 121, such that the reference current (Iref) is applied to the VDAIM node.

Accordingly, assuming that the sum of the turned-on switches 22 among the switches 22 (S1, S2, S3 . . . Sn) is C, the current applied to the VADIM becomes Iref×(1+C).

At this time, the C may not be an integer according to the ratio of the current mirror 120.

Meanwhile, since the turn-on/off of the switches 22 may be controlled by the selector 10, the magnitude of the control signal (SEL voltage) is adjusted, thereby making it possible to change the C. As a result, it is possible to change the current of the LED only through the adjustment of the control signal.

Figure 4:
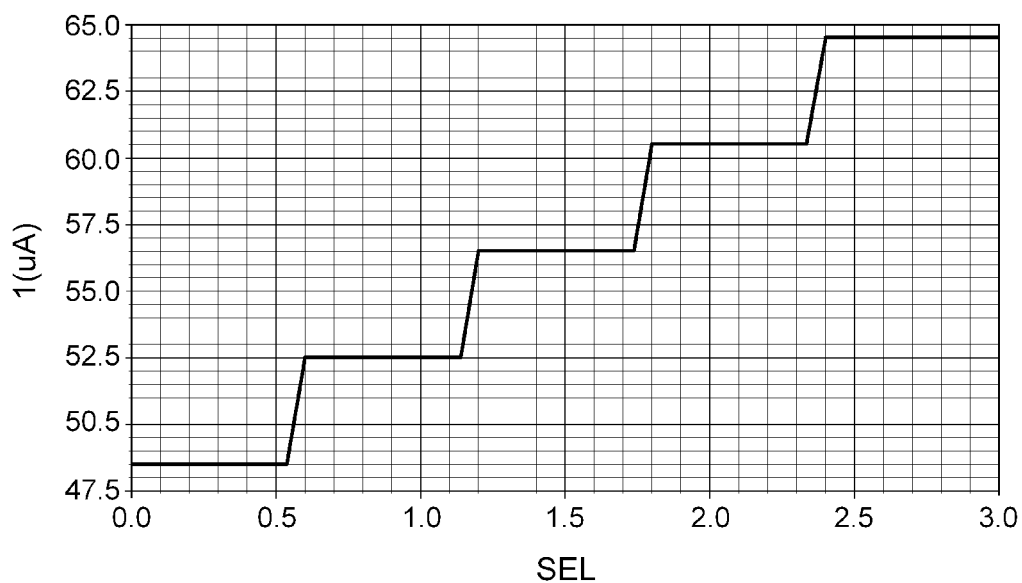
FIG. 4 is a graph showing current at a VDAIM node according to an exemplary embodiment of the present invention.
Figure 5:
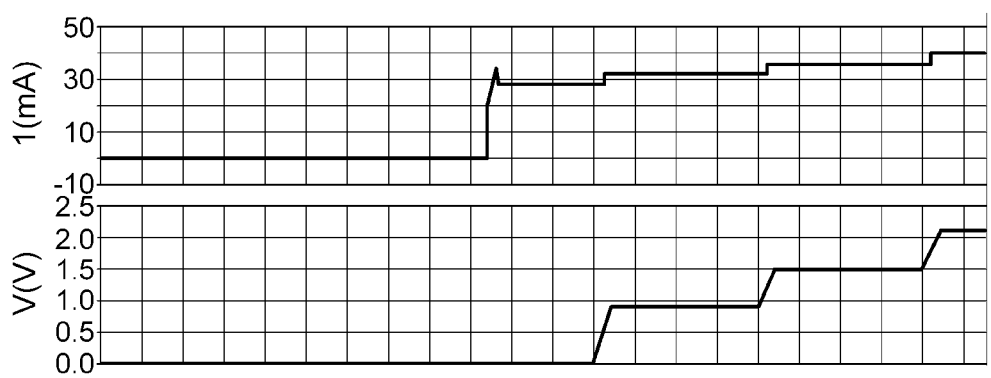
FIG. 5 is a graph showing current and voltage of a final output end according to an exemplary embodiment of the present invention.

Results shown in FIGS. 4 and 5 have been obtained by simulating the configuration according to the present invention using the method as described above.

FIG. 4 shows current at a VDAIM node according to a change in SEL voltage, and FIG. 5 shows current and voltage of a final output end according to a change in SEL voltage.

Although the case in which the current at VDAIM is increased according to the increase of the SEL voltage has been shown in FIG. 4, it will be easily appreciated that the current at VADIM may be reduced according to the increase of the SEL voltage by inverting the polarity of the reference voltage (Vref) divided by the resistor 12.

As set forth above, the present invention adjusts the SEL input to control the current of the LED, thereby not generating a problem due to a noise as in an input voltage control scheme according to the related art. In addition, it is not required to replace the resistor or configure the resistor as a variable resistor. Therefore, the LED driving module may be standardized, thereby making it possible to reduce cost of the LED driving module.

The present invention has been described in connection with what is presently considered to be practical exemplary embodiments. Although the exemplary embodiments of the present invention have been described, the present invention may be also used in various other combinations, modifications and environments. In other words, the present invention may be changed or modified within the range of concept of the invention disclosed in the specification, the range equivalent to the disclosure and/or the range of the technology or knowledge in the field to which the present invention pertains. The exemplary embodiments described above have been provided to explain the best state in carrying out the present invention. Therefore, they may be carried out in other states known to the field to which the present invention pertains in using other inventions such as the present invention and also be modified in various forms required in specific application fields and usages of the invention. Therefore, it is to be understood that the invention is not limited to the disclosed embodiments. It is to be understood that other embodiments are also included within the spirit and scope of the appended claims.

What is claimed is:

1. A device for controlling current of a light emitting diode (LED), the device comprising:
   a constant current generator;
   a current mirror;
   a current amplifier;
   a selector outputting an L signal or an H signal according to an input control signal; and
   a current changing unit including at least two switching units connected in parallel, each of the switching units including a transistor and a switch connected to the transistor in series,
   wherein the switch of each of the switching units in the current changing unit is controlled by the signal output from the selector, and
   wherein the selector includes at least one amplifier, the at least one amplifier having a non-inverting terminal receiving the control signal and an inverting terminal receiving a voltage divided by a resistor, and the at least one amplifier comparing a voltage of the inverting terminal with that of the non-inverting terminal to output the L signal or the H signal to an output terminal.

2. A device for controlling current of a light emitting diode (LED), the device comprising:
   a constant current generator;
   a current mirror;
   a current amplifier;
   a selector outputting an L signal or an H signal according to an input control signal; and
   a current changing unit including at least two switching units connected in parallel, each of the switching units including a transistor and a switch connected to the transistor in series,
   wherein the switch of each of the switching units in the current changing unit is controlled by the signal output from the selector, and
   wherein the selector has inverting terminals receiving the control signal, non-inverting terminals receiving voltages divided by at least one resistor, and at least one amplifier comparing a voltage of one of the inverting terminals with that of a corresponding one of the non-inverting terminals to output the L signal or the H signal to an output terminal.

3. A device for controlling current of an LED, comprising:
   a constant current generator;
   a current mirror including a first MOS transistor and a second MOS transistor;
   a selector outputting an L signal or an H signal according to an input signal;
   a MOS transistor having a source receiving driving power and a gate connected to a gate of the first MOS transistor;
   a current changing unit including a switch of which one end is connected to a drain of the MOS transistor; and
   a current amplifier having an input end connected to the other end of the switch of the current changing unit,
   wherein the switch is controlled by the signal output from the selector.

4. The device according to claim 3, wherein the current changing unit includes a plurality of switching units in which a switch is connected to the MOS transistor, the plurality of switching units being connected in parallel.

* * * * *